United States Patent [19]
Brunson

[11] 3,987,417
[45] Oct. 19, 1976

[54] ADDRESS MEMORY SYSTEM

[76] Inventor: Raymond D. Brunson, 5404 Brixham Court, Burke, Va. 22015

[22] Filed: Oct. 7, 1974

[21] Appl. No.: 512,682

[52] U.S. Cl. .............................. 340/172.5; 235/151
[51] Int. Cl.² .......................................... G11C 9/00
[58] Field of Search ................ 340/172.5; 235/168, 235/151, 152

[56] References Cited
UNITED STATES PATENTS

| | | | |
|---|---|---|---|
| 3,295,849 | 1/1967 | Miller et al. | 235/151 X |
| 3,310,659 | 3/1967 | Apostle et al. | 235/151 X |
| 3,375,352 | 3/1968 | House et al. | 235/151 |
| 3,609,665 | 9/1971 | Kronles et al. | 340/172.5 |
| 3,701,105 | 10/1972 | Harper et al. | 340/172.5 |
| 3,718,812 | 2/1973 | Tillman et al. | 235/151 X |

*Primary Examiner*—Edward J. Wise
*Attorney, Agent, or Firm*—Warren H. Kintzinger

[57] ABSTRACT

A binary address memory unit which generates, in response to successive command inputs, successive binary output address words which progress directly according to binary count. Each command input provides for generation of time sequenced clock pulses which, in conjunction with an adder circuit, causes a next successive higher output to be generated from an output register and causes binary one to be added to that output as a stored address to be read out upon the time occurrence of a next successive input command.

6 Claims, 3 Drawing Figures

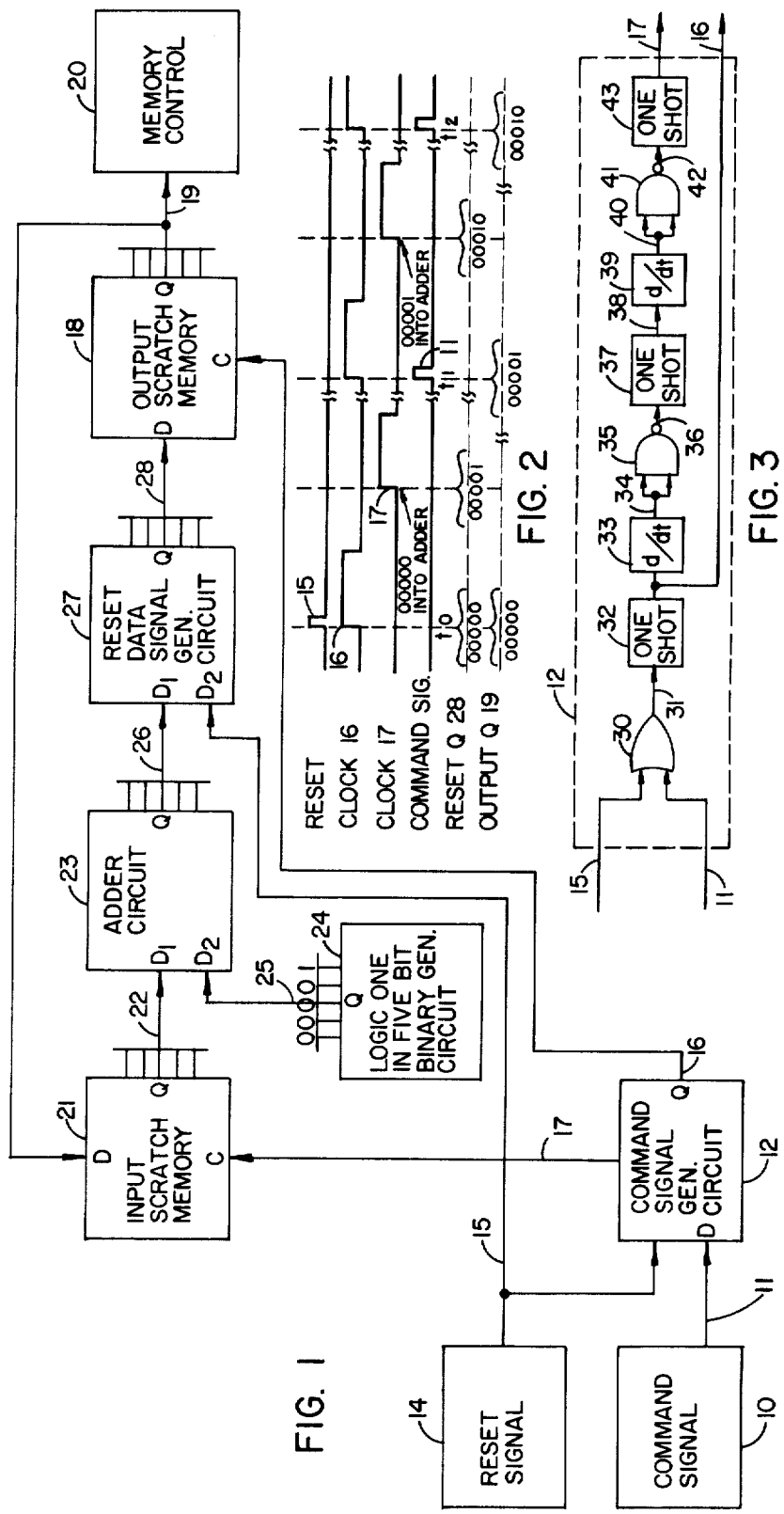

ADDRESS MEMORY SYSTEM

The object of the present invention is, accordingly, the provision of an address memory unit suitable for sequential addressing a memory where successive ball scores are stored in the memory in direct sequential order according to the binary count.

A further object of the invention is the provision of a binary address memory unit which serves as a memory of the last address in a sequence and as a means to obtain the next address.

Features of this invention useful in accomplishing the above objects include, in a memory addressing unit, means responsive to a reset input pulse and successive command input pulses, to develope a multi-bit binary output signal from a binary storage register of the latch type, wherein the storage register output progresses directly in direct binary sequential order, and wherein the output count is recirculated and increased by one and presented as input to the register at the time occurrence of a next subsequent command input pulse. At time of reset, the output is binary zero and progresses in binary sequential order to binary one at command pulse one, binary two at command pulse two, etc. The output register, which functions as a scratch memory, is applied as input to a further register of the latch type which likewise functions as a scratch memory. A command signal generator, responsive to the reset and command input signals, provides time sequenced clock pulses which, in conjunction with an adder circuit, adds one to the output of the unit and presents it as input to the output register prior to the time of a next successive one of the command input pulses. Each command input then generates a next successive higher binary output from the output register and causes binary one to be added to that output as a stored input to the output register for readout upon the time occurrence of a next successive input command.

A specific embodiment representing what is presently regarded as the best mode of carrying out the invention is illustrated in the accompanying drawing.

In the drawing:

FIG. 1 represents a functional block diagram of an address memory unit;

FIG. 2, operational waveforms related to the operation of the address memory unit depicted in FIG. 1; and, FIG. 3, a block diagram of a command signal generator.

The address memory unit of FIG. 1 responds to reset and command signal inputs. A command signal source 10 provides a first input 11 to a command signal generator circuit 12. A reset signal source 14 provides a second input 15 to the command signal generator circuit. As will be further described, the generator circuit 12 developes, in response to reset and command input signals 15 and 11, first and second time sequential output control signals 16 and 17. Control signal 16 is applied as a clock input to an output scratch memory 18. The output 19 of memory 18 comprises the addressing output of the address memory unit and is depicted as being applied, for addressing purposes, to a memory control 20, the latter comprising a random access memory into which binary words are stored in direct sequential order according to binary count.

The output 19 of scratch memory 18 is illustrated as comprising an n-bit binary number where $n$ is exampled as five, and is thus capable of representing, in binary notation, the decimal numbers zero through 31. The five-bit capability is exampled, considering the need for providing 21 sequential address numbers for successive bowling ball pin scores, where 21 is the maximum number of balls that may be rolled in a line of bowling.

The five-bit paralleled output 19 of memory 18 is applied as input to a further memory, designated as input latch memory 21. Control signal 17 from command signal generator circuit 12 is applied as a clock input to input memory 21.

The output 22 of memory 21 is applied as a first input to an adder cicuit 23. A five-bit binary generator circuit 24 continuously provides a binary one input 25 which is applied as a second input to adder circuit 23. Output 26 of adder circuit 23 (defined as input $D_1$ plus one) is applied as input to a reset data latch circuit 27. Reset input signal 15 comprises a controlling input to data reset data latch 27. A recirculating data loop is completed by the output 28 of reset data latch 27 being applied as input to output scratch memory 18. Considering now the general operating characteristics of the functional blocks of FIG. 1, both input scratch memory 21 and output scratch memory 18 function similarly. Information at the inputs D of these devices is continuously transferred to the outputs Q as long as the clock input C is high (binary 1), and, when clock C goes low (binary 0), the output Q maintains (stores) the information it had before the clock C went low. Scratch memories 21 and 18 may each comprise, for example, a type SN7475 TTL integrated circuit, commercially available from a number of manufacturers, including Texas Instruments, Motorola and Fairchild.

The reset data latch circuit 27 continuously transfers input information $D_1$ to the output Q as long as input $D_2$ is low. When input $D_2$ goes high, the output Q goes to binary zero (00000) for all conditions. Reset data circuit 27 may comprise, for example, a type SN 7408 TTL integrated circuit, commercially available from a number of manufacturers, including Texas Instruments, Motorola and Fairchild.

The adder circuit 23 conventionally adds input information at $D_1$ and $D_2$ to provide the binary sum thereof as output Q. Generator 24 continuously generates a five-bit binary number of the decimal number one and applies this binary count, (00001) to input $D_2$ of adder circuit 23. Adder circuit 23 may comprise for example, a type SN 7483 TTl integrated circuit, commercially available from the above-referenced manufacturers. The command signal generator 12, as will be further evident, develops, in response to reset inputs 15 and subsequent command signal inputs 11, a first positive pulse output signal 16 to clock output memory 18, and a second positive pulse output signal 17 to clock input scratch memory 21. Signals 16 and 17 may be substantially similar, with signal 17 being time spaced (delayed) with respect to signal 16.

Operation of the total circuit, with added reference to FIG. 2, is as follows:

Reset signal 15 is applied at input $D_2$ of zero reset cicuit 27 and the output 28 of reset latch memory circuit 27 is set to zero. Command signal generator 12 generates a high output 16 for application to the clock input of output memory 18, thus the zero input applied on lines 28 is transferred to the output 19 of output memory 18. The zero output 19 from output memory is applied as input to input memory 21, but is not transerred to the output 22 thereof because clock input 17 hereto is low.

The clock input of input memory 21 then gets a positive pulse 17 from the command signal generator 12. This positive pulse 17 (high) transfers the binary zero input to memory 21 to the output 22 where it is retained as input to $D_1$ of adder circuit 23. A binary one (00001) on line 25 from generator 24 on adder input $D_2$ is added to the binary zero on adder input $D_1$ and the binary one resultant on adder output 26 is presented on input $D_1$ of reset latch memory 27, and is transferred to the output 28 thereof since the reset signal 17 on $D_2$ thereof is low. Output 28 of reset scratch memory (now binary 1) is applied to input D of the output memory 18, where it stops, since the clock input 16 of memory 18 is low. The system now waits for a next subsequent command input. When a command signal 11 is then passed to D of the command signal generator 12 (see time $T_0$, FIG. 2), a clock signal 16 is caused to again present a positive pulse on the clock input C of output memory 18, which transfers the binary one (already present on input D of output memory 18) to the output 19 of output memory 18.

Note, with reference to FIG. 2, that the clock pulse 16 from command signal generator 12 is generated prior to clock pulse 17. When clock pulse 17 subsequently goes high, this positive pulse on the clock C of input memory 21 transfers the binary one then present on input D of memory 21 to the output 22 thereof, where it is returned and applied as input to $D_1$ of adder circuit 23. This binary one (00001) has a binary one (00001) from generator 24 added to it to produce a binary two (00010) at output 26 thereof which is transferred, through reset latch 27 ($D_2$ input being low since reset pulse 15 is low) to the input D of output memory 18, where it stops for lack of a high clock signal on clock input C thereof.

The above process continues for each successive input command signal. In response to a reset input, the output 19 is seen to be bindary 0, followed in time sequence by an input 28 to the output scratch memory of binary 1. The first time subsequent command input 11 generates a binary 1 at output 19, followed by a binary 2 input 28 to the output scratch memory. Each successive command input causes, in time sequence, the output from the output scratch memory and the input 28 thereto to advance by a binary one increment.

Command signal generator 12 might comprise various circuits to generate the time sequenced clock output pulses 16 and 17 in response to successive ones of the reset and command signal inputs thereto.

FIG. 3 depicts, by way of example, a signal generator circuit 12 useful in generating clock outputs in the above-described time sequence. Reset input 15 and command inputs 11 are applied through or gate 30 as a triggering input 31 to a first one-shot multivibrator 32. The output 16 from multivibrator 32 comprises the clock input to output scratch memory 18 of FIG. 1. The trailing edge of output pulse 16 is utilized to trigger a second one-shot multivibrator 37. This may be accomplished, for example, by the application of pulse 16 to a differentiator 33 with the output 34 thereof applied in common to inputs of a NAND gate 35. The output 36 from NAND gate 35 then comprises a triggering pulse for one-shot multivibrator 37. The trailing edge of the pulse output 38 of multivibrator 37 may similarly be utilized to trigger a third one-shot multibibrator 43, by applying output 38 through differentiator 39 and applying the output 40 of differentiator 39 in common to inputs of a NAND gate 41. Output 42 from NAND gate 41 then comprises a triggering pulse for one-shot multivibrator 43, and output 17 from multivibrator 43 comprises the clock input to input scratch memory 21 of FIG. 1. The multivibrator 32 thus defines the time duration of clock pulse 16; the multivibrator 43 defines the time duration of clock pulse 17, and the multivibrator 37 defines the time separation between the trailing edge of clock pulse 16 and the leading edge of clock pulse 17. In response to each successive reset and command input pulse, the command generator is thus seen to generate clock pulses 16 and 17 in time-spaced sequence.

In use for addressing a random access memory, the address memory unit herein described generates in response to successive command inputs, output addresses in binary sequence from binary 0 at reset, through the binary number corresponding to $2^N-1$, where N is the number of bits incorporated in the scratch memories. The command inputs to the address memory unit might then correspond to the entry time of score words stored into a random access memory in direct sequential order according to binary count.

Whereas this invention is herein illustrated and described with respect to a particular embodiment thereof, it should be realized that various changes may be made without departing from essential contributions to the art made by the teachings thereof.

I claim:

1. A sequential binary addressing and storage unit comprising timing wave-form generating means receiving a repeated sequence of a first input comprising a reset signal and a second input comprising time sequential ones of a plurality of command pulses, said wave-form generating means responsive to each of said reset and command pulse inputs to generate in time sequence first and second time-spaced clock signals prior to the time occurrence of a next time-subsequent one of said reset and command input pulses, an output scratch memory, an input scratch memory receiving the output of said output scratch memory as input thereto, means for adding a binary one to the output of said input scratch memory and applying the sum to the input of said output scratch memory upon the time occurrence of said second clock signal, means for transferring the input of said output scratch memory to the output thereof in response to said first clock signal, means responsive to said reset input pulse to reset the input of said output scratch memory to binary zero, and the output of said unit comprising the output of said output scratch memory.

2. The sequential binary addressing and storage unit of claim 1, wherein each of said input and output scratch memories comprises an output storage register and gate responsive input signal transfer means, the gate responsive input signal transfer means of said output memory receiving said first clock pulse as a gating input thereto, and the gate responsive input signal transfer means of said input memory receiving said second clock signal as a gating input thereto.

3. The sequential binary addressing and storage unit of claim 2, wherein the means for transferring the output of said binary adder to the input of said output scratch memory comprises a further scratch memory having an output storage register and gate responsive input signal transfer means, said further scratch memory receiving the output of said binary adder, the output of said further scratch memory being applied to the input of said output scratch memory; said further scratch memory having applied as a gating input thereto said reset pulse, and including logic means response to said reset pulse to reset the output thereof to binary zero and responsive to the absence of said reset pulse to continually transfer the input thereto to the output thereof.

4. The sequential binary addressing and storage unit of claim 3, wherein each of said input and output scratch memories has a capacity of N-bits and said plurality of command pulses does not exceed $2^N-1$.

5. The sequential binary addressing and storage unit of claim 4, wherein said means for adding comprises a binary adder receiving the output of said input scratch memory as a first input thereto, and a continuous signal of binary-one weight as a second input thereto, with the output of said binary adder being applied to the input of said output scratch memory.

6. The sequential binary addressing and storage unit of claim 5, wherein said signal of binary-one weight comprises the output of an N-bit binary signal source.

* * * * *